United States Patent [19]

Coles et al.

[11] 3,786,313

[45] Jan. 15, 1974

[54] PANELBOARD ASSEMBLY WITH IMPROVED SUPPORT MEANS

[75] Inventors: Sidney J. Coles, Carlisle; Bernard C. Teal, Ancaster, Ontario, both of Canada

[73] Assignee: Westinghouse Canada Limited, Hamilton, Ontario, Canada

[22] Filed: May 17, 1972

[21] Appl. No.: 254,296

[52] U.S. Cl............... 317/120, 317/119, 174/70 B, 174/133 B, 174/171
[51] Int. Cl.................................................... H02b
[58] Field of Search.................. 317/112, 117, 118, 317/120; 174/68 B, 70 B, 71 B, 129 B, 133 B, 149 B, 171

[56] References Cited
UNITED STATES PATENTS

| | | | |
|---|---|---|---|
| 2,997,627 | 8/1961 | Ellegood | 317/117 X |
| 3,491,268 | 1/1970 | Christensen | 317/119 |
| 2,969,421 | 1/1961 | Scott | 174/133 B |
| 3,210,716 | 10/1965 | Meacham | 174/171 |
| 3,144,587 | 8/1964 | Darlow | 317/120 X |

Primary Examiner—Robert K. Schaefer
Assistant Examiner—Gerald P. Tolin
Attorney—A. T. Stratton et al.

[57] ABSTRACT

This invention relates to a panelboard assembly which is largely composed of a number of standard premanufactured components. The components may be easily assembled together to give a variety of combinations of assemblies so as to be adaptable to receive an exceedingly large number of breaker combinations. Because most of the interior components of the panelboard are fabricated from standard extrudable components, it is possible to manufacture the panelboard in a variety of lengths and widths, so as to be able to supply panelboards having a wide range of power ratings. Also, because of the case with which the interior components of the panelboard may be conveniently manufactured in various dimensions, it is possible to adapt the panelboard for use in areas where physical dimensions are limited because of some prior requirement, such as a restraint on size due to the installation of a previously smaller-rated panelboard or some other restriction of a similar nature.

8 Claims, 10 Drawing Figures

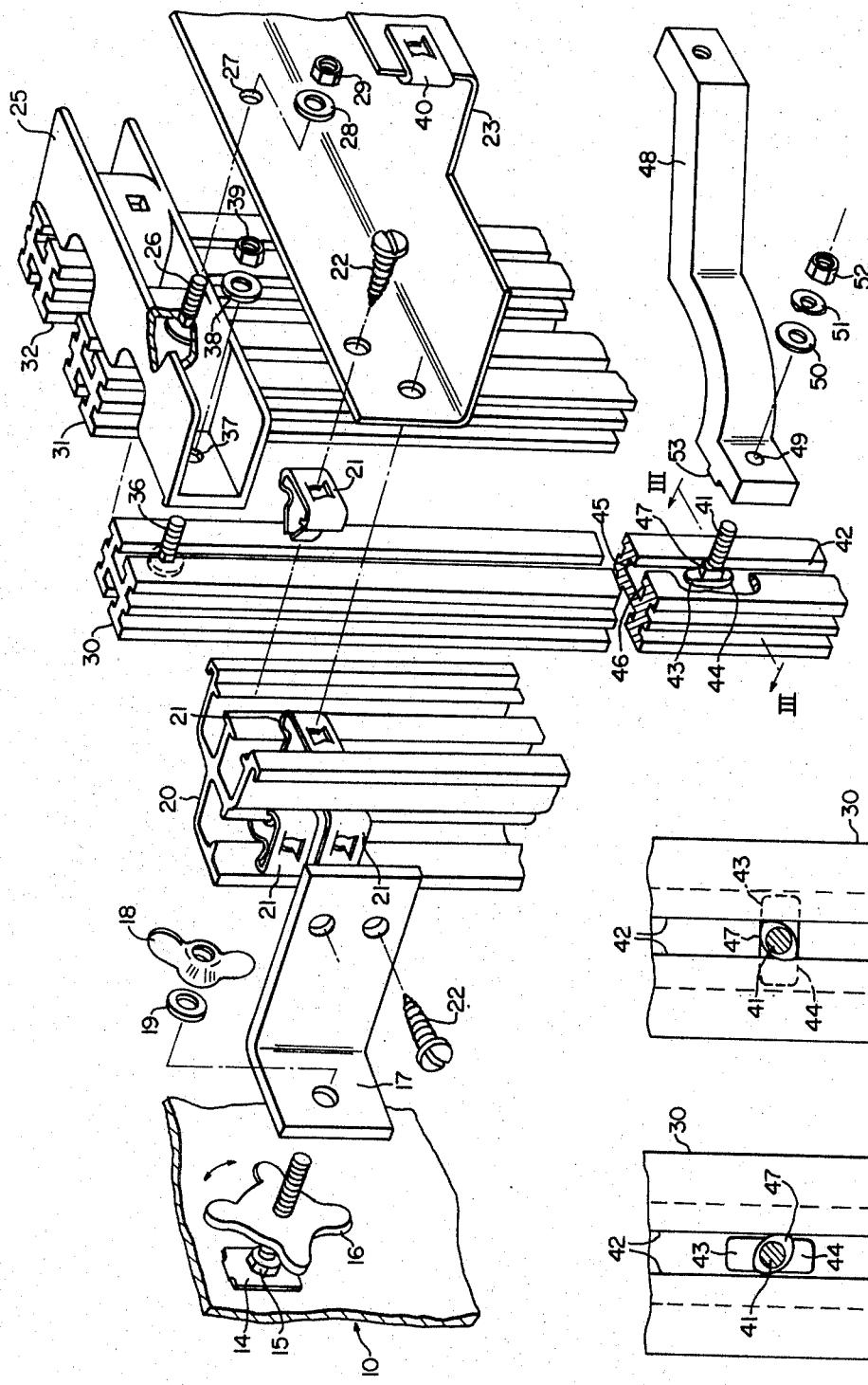

PANELBOARD ASSEMBLY WITH IMPROVED SUPPORT MEANS

CROSS REFERENCES TO RELATED APPLICATIONS

Canadian Application Ser. No. 125,458, filed Oct. 19, 1971 entitled "Panelboard Assembly."

Canadian Application Ser. No. 092,606, filed Sept. 9, 1970 entitled "Terminal Lug Assembly."

United States Application Ser. No. 165,461, filed July 23, 1971 entitled "Bus Connector Assembly."

BACKGROUND OF THE INVENTION

Manufacturers of commercial panelboards have been reluctant to alter designs which have been in existence for many years for a variety of reasons. Probably the fact that the complete panelboard as well as the components thereof must be tested and approved by various regulating authorities have caused the manufacturers to be somewhat conservative in their approach to changes in designs. It has generally been standard practice to mount the bus bars of the panelboard by some means or other a suitable distance from the metal back of the enclosing structure. Generally the supports which performed this function were made of phenolic resin or some other such suitable insulating material which would hold and support the flat bus bars a suitable distance from the grounded enclosing structure. The bus bars were generally flat copper conductors which had a number of holes bored and tapped along their lengths so as to be able to receive connector assemblies which could be used to carry electric current to the breakers in the structure. Generally the neutral bus was located above the bus bar structure, and it was arranged to be well insulated from the live bus bars by the use of suitable insulating members.

The side supports used to support the heavy breaker assemblies were generally arranged to be fastened in some manner to the enclosing structure and screws which were used to hold the breakers firmly in place could be screwed into a variety of holes which also were drilled and tapped into the side supporting members.

The problems encountered in constructing and using prior art designs were numerous and varied. Firstly, if a variety of breaker sizes were to be accommodated in one panelboard assembly, it might be necessary to drill and tap many additional holes in either the bus bars themselves or the side supports or probably in both structures. Greater difficulties generally arose if an additional breaker was to be added at some time after the original installation was made. This could entail removing the bus bar assembly from the enclosing structure in order to make the installation. It was generally impossible to change the rating of a panelboard once it was assembled and installed and even during assembly uprating could be difficult because generally the only method available was an arrangement whereby a second bus bar was strapped directly behind the first bus bar to give additional current carrying capacity for each phase. This caused additional problems due to lack of electrical clearance in a panelboard enclosure which was previously designed for only one thickness of bus bar. The present invention overcomes many of the prior problems inherent with the designs which have been in commercial use for quite some time.

SUMMARY OF THE INVENTION

Because the panelboard of the present invention employs a large number of extrudable components, it is possible to build a wide variety and shapes and ratings of panelboard assemblies. Practically the entire panelboard assembly may be assembled from the front facing side without requiring any removal of bus bars or supports or other structure in order to wire the assembly and add breaker assemblies to the panel. The supporting enclosure is equipped with suitable apertures for receiving a special fastening bolt which may be inserted from the front face of the enclosure to receive the specially shaped side supporting struts of the bus bar assembly. The side supporting struts have a predetermined cross-section which makes possible receipt of special fastening devices for simplified installation. A cross supporting member is bolted between the two specially shaped side supporting members by means of special fasteners and an insulating bus bar supporting member is conveniently fastened to the rear side of the cross supporting member. The bus bars which are of a special predetermined shape are bolted to the insulating spacer member mounted on the cross support member. The particular construction allows the cross supporting member to be located anywhere along the length of the side supporting members and because of the special fastening devices used, no drilling or tapping is required on any of the members mentioned to assemble the structure described.

It is envisioned that as many as six bus bars may be supported on the rear face of insulating members fastened to the cross support members. Because of the predetermined shape of the bus bar themselves, it is possible to fasten shorting bars at any height between any two buses of the same phase in order to obtain superior current distribution in the panel assembly. For instance, if a system were using two bars per phase it would be possible to connect at least three sets of shorting bars between the bus bar of like phases.

A special bolt may be inserted and locked into a slot in any of the bus bars from the front side of the bus bar which may readily secure a suitable connector. When one to three suitable connectors have been fastened to bus bars of different phases, a breaker may be mounted thereon and additional support will be formed by mounting the breaker to the side support member with a special fastener also. By utilizing a wide variety of connector members, it is possible to mount a variety of breakers of widely different ratings on the bus bar assembly.

The mounting technique previously described for the bus bars on the insulating support members, now facilitates and simplifies the placement of the neutral bus in the same end region where the phase buses are located and yet it is possible to maintain adequate clearances between the bus bars of different phases and the neutral bus. It is possible to use speed rivets to mount insulating material at any location on the phase bus bars of the neutral bus bar where electrical clearance is deemed to be inadequate.

Finally, the shield may be fastened to the supporting enclosure by means of bolts and the filler panels to be incorporated in the shield (where there is an absence of breakers) are fabricated from a suitable extruded material which will allow fast and convenient assembly in the shield. The shield may now be fastened to the supporting enclosure and the presence of the filler panels combined with the areas where the operating mechanism for breakers are present combine to give an overall pleasing effect.

BRIEF DESCRIPTION OF THE DRAWINGS

FIG. 2 is an enlarged exploded perspective view of the main construction of the panelboard;

FIG. 3 is an illustration of the bus bar connector bolt assembly;

FIG. 4 is another illustration of the bus bar bolt connector assembly;

DESCRIPTION OF THE PREFERRED EMBODIMENT

Before describing the invention in detail, it will be found that many of the interior components of the panelboard assembly about to be described are formed by cropping lengths of long extruded pieces. It will therefore be convenient to refer to the cross-sectional shape of these members as being an extrudable shape, and it will be understood in the ensuing description that when the words "extrudable shape" are used, it merely designates a member whose shape is constant throughout its length and which of course is formed by cropping a suitable length from the extruded piece.

Figure 1:
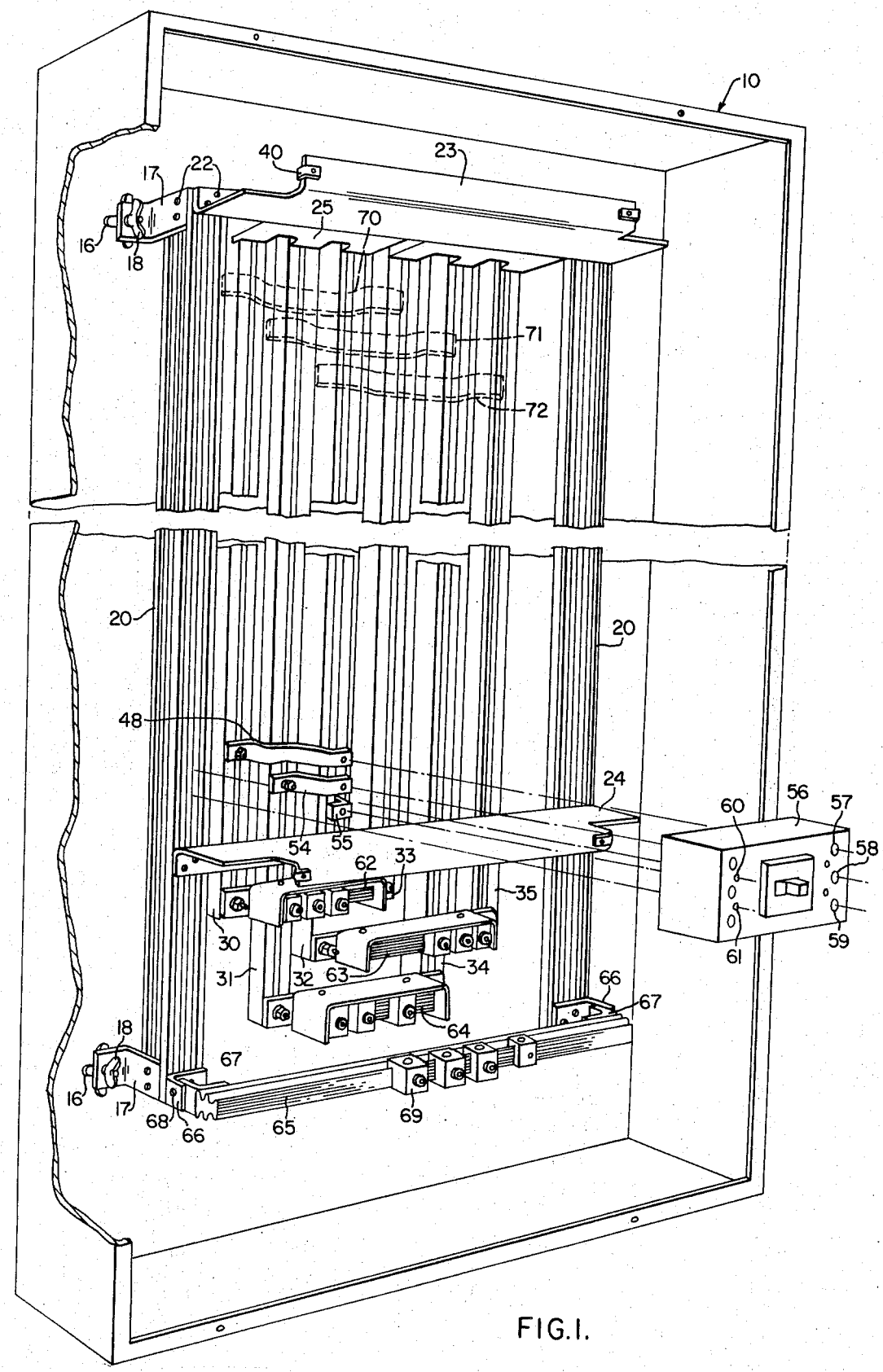
FIG. 1 is a perspective view of the enclosing structure and the bus bar supporting structure of the basic panelboard minus the trim member.
Figure 8:
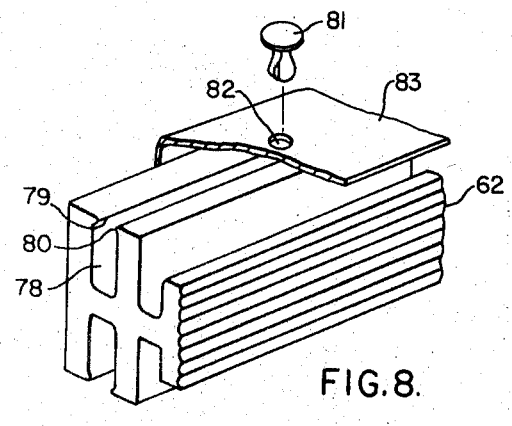
FIG. 8 is an illustration of the fastening of an insulating member to the bus bar.
Figure 5:
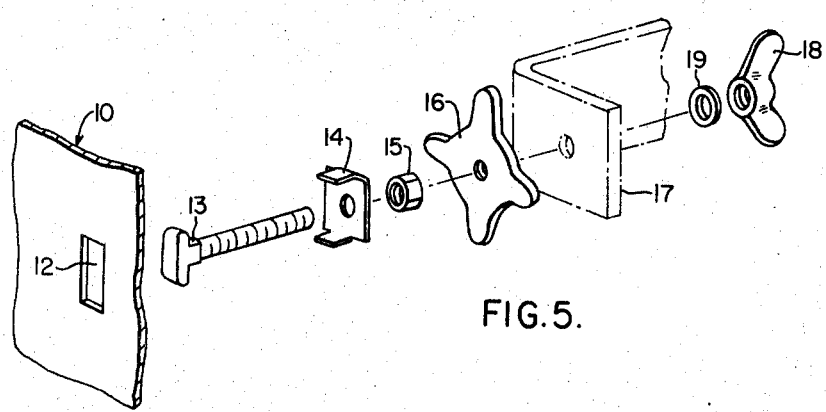
FIG. 5 shows the method of connection of the bus bar supporting members by means of a special bolt which is fastened into the rear face of the supporting enclosure.

Referring now to FIG. 1, in particular, and FIGS. 2 and 8 generally, which are amplifications of certain areas of FIG. 1, it will be seen that a metal enclosure 10, which also serves as a supporting structure for the balance of the assembly, has formed therein a series of rectangular apertures 12 through which the head of a special mounting bolt 13 is inserted (see FIG. 5). Bolt 13 is provided with a special locating tab 14 which has twin ears to protrude through the aperture 12 which serves to locate bolt 13 in the center of aperture 12. Bolt 13 has the configuration of a carriage-bolt with special modifications to make it adaptable for fast and convenient assembly, and it will be found that bolts similar to bolt 13 will be used at various locations in the construction of the complete panelboard assembly. Bolt 13 is provided with a head which is of a generally rectangular configuration, such as would occur if a standard carriage bolt had two segment-shaped areas of the head portion removed, and bolt 13 is further provided with a special shoulder which differs substantially from the usual carriage bolts used in the trade. It will be noted that bolt 41 shown in FIGS. 2, 3 and 4 is essentially the same shape as the bolt 13, presently being described and the shape of the shoulder shown at 47 is clearly illustrated in FIG. 2. The method of securement of bolt 13 in aperture 12 is as follows; mounting tab 14 is mounted on bolt 13 and nut 15 is advanced along the threaded portion of bolt 13 until tab 14 is rotatably secured against the shoulder provided on bolt 13. Tab 14 is then slid on bolt 13 until the projecting ears are aligned with the elongated head of bolt 13. At this time it is possible to insert the head of bolt 13 and the projecting ears of tab 14 through the aperture 12. In attempting to finally secure bolt 13 in the rear face of the enclosure 10, nut 15 will be tightened and the elongated head of bolt 13 will twist 90° until the shoulder provided on bolt 13 engages the two side walls of aperture 12. At this time provided that aperture 12 has the proper dimensions, the head of bolt 13 will be located transverse to the slot of aperture 12.

When bolt 13 has been securely fastened in the rear face of the enclosure 10 a spacer member 16 is twisted onto the projecting threaded portion of bolt 13 so that the entire assembly may be conveniently spaced from the rear surface of enclosure 10 by the presence of rotatable spacer 16 on bolt 13, and angle member 17 which will be used to support the bus bar assembly is next fastened on to the projecting threaded portion of bolt 13. Angle member 17 is advanced along the threaded portion of bolt 13 by means of a clearance hole provided therein and lock washer 19 and wing nut 18 are advanced on the threaded portion of bolt 13 until angle member 17 is securely held between spacer 16 and nut washer combination 18 and 19. It will be understood that generally at least four bolts such as the one illustrated as 13 will be used to secure the bus bar assembly in the enclosure 10.

A side supporting member illustrated by reference 20 is next secured to the angle member 17 (see FIG. 2). The side supporting member 20 is made to have an extruded shape and it will be noted that it has several specially shaped receiving channels to accept "clip-in" fasteners such as those illustrated by numeral 21. Side supporting member is firmly attached to angle member 17 by means of screws such as those illustrated as 22 which are passed through the holes provided in the angle member 17 and rotatably secured in the fastening members 21. It is noted that as screw 22 is advanced into the interior of fastener 21, that the rear projections of fastener 21 are firmly secured against the projections provided in the side supporting members 20 so that it becomes difficult, if not impossible, to remove member 21 from the slot in which it is engaged when screw 22 has been firmly secured therein.

When both side supporting channels 20 have been firmly secured by means of screws 22 and fasteners 21, upper and lower cross supporting members 23 and 24 respectively are mounted on the side supporting members 20. The upper and lower cross supporting members may be fabricated from any suitable sheet material such as steel or aluminum and it will be seen that the upper and lower supporting members are fastened to the side supporting members by means of screws 22 and fasteners 21 which are similar to the fastening means previously described.

Next, an insulating bus bar supporting member illustrated as 25 for the top-most cross supporting member 23 is shown being bolted to the rear surface of cross supporting member 23 by means of a bolt 26 passing through hole 27 provided in the cross supporting member, thence having a lock washer 28 and a nut 29 advanced along the threaded portion of bolt 26 until insulating support 25 is firmly held against the rear surface of cross supporting member 23. It is envisaged that there will be approximately the same number of bolts 26 used to fasten the insulating spacer 25 to the cross supporting member 23 as there are bus bars. A similar insulating support will be bolted to the cross supporting member 24 to provide support for the lower portion of the bus bar. Bus bars shown as references 30 to 35 respectively are attached to the insulating member 25 by means of bolts similar to the bolt illustrated as reference 36. In this instance, bolt 36 is illustrated as a standard carriage bolt, however, it will be obvious to those skilled in the art that bolt 36 may have a different head configuration than that illustrated for bolt 36.

It will be noted that the rear surface of insulating spacer 25 which forms the abutting face for the forward face of the bus bars 30 to 35 inclusive now becomes a "reference" plane for the front surface of the bus bars in the panelboard assembly. This is a significant departure from the construction of panelboards previously manufactured in that in panelboards previously manufactured the bus bars have been mounted with their rear face against an insulating support instead of the front face being mounted against an insulating support as previously described. It will be seen that it is not difficult to change the clearance between the rear surface of the bus bars 30 to 35 and the rear face of the enclosure 10. It is possible to adjust the spacing by the adjustment of spacer members shown as 16 and if a large permanent change in clearance is desired, it is possible to change the angle members 17 to increase or decrease the clearance between the rear face of the bus bars and the rear surface of the panelboard assembly.

The cross supporting members 23 and 24 are provided with speed fasteners such as the fastener illustrated as 40, for providing mounting means for the trim member of the panelboard. Next the mounting of a circuit breaker on the bus bar assembly will be described.

A specially fabricated bolt such as the one illustrated by reference 41 which is essentially similar to bolt 13 previously described, will be employed to mount a connector to the appropriate bus bar. It is possible to slide the elongated head of bolt 41 in to throat 42 and when the head of bolt 41 has been inserted in to throat 42 a sufficient distance, the projections 43 and 44 of the head of bolt 41 will be permitted to turn through 90° as illustrated in FIGS. 3 and 4 so that the projections 43 and 44 engage shoulders 45 and 46 of the bus bar 30 (illustrated in FIG. 2). The shoulder as illustrated as 47 of bolt 41 will only allow bolt 41 to turn 90° before it engages the throat portion 42 of the bus bar.

The sequence followed to secure a connector such as the one illustrated as 48 to a bus bar 30 is as follows. Bolt 47 is inserted through clearance hole 49 provided in connector 48. A washer 50, lock washer 51 and a nut 52 are fastened on to the threaded end of bolt 41 so that nut 52 is located just at the threaded end of bolt 41. The connector 48 is then abutted against the bus bar 30 so that the projections 43 and 44 of bolt 41 pass through the throat member 42 of the bus bars 30. This will allow the connector 48 to fit firmly against the bus bar 30 such that projections such as the ones shown as 53 will fit into the throat portion 42 of the bus bar to prevent any twisting of connector 48 about the axis of hole 49. When the connector 48 is in suitable abutting engagement with the bus bar 30, nut 52 is pushed so as to insert the head of bolt 41 deeply into the throat of the bus bar and upon twisting nut 52 in a clockwise direction projections 43 and 44 are twisted 90° to engage shoulders 45 and 46 of bus bar 30. The angle of twisting of bolt 41 is limited to 90° by the engagement of shoulder 47 with the throat portion 42 of the bus bar. Nut 52 is twisted in a clockwise direction until connector 48 is firmly attached to the bus bar 30.

Referring specially to FIG. 1, it will be noted that connectors 54 and 55 are also attached to bus bars 31 and 32 respectively by means of bolts similar to previously illustrated bolt 41, the only difference being that the shape of the connectors has been altered so that the mounting holes for the terminal portions of the circuit breaker to be attached are now in the same plane and are vertically aligned.

In order to mount a circuit breaker such as the one illustrated as 56 on the bus bar assembly, suitable conducting terminal bolts are passed through the apertures 57, 58 and 59 which contain metallic terminals for the circuit breaker 56 and the bolts subsequently pass in to threaded holes in connectors 48, 54 and 55 respectively to secure the circuit breaker to the bus bars. Similarly, two screw fasteners are passed through holes 60 and 61 provided in breaker 56 and the screw fasteners are subsequently threaded into "clip-in" fasteners similar to the fastener illustrated as 21 in FIG. 2. It will be immediately apparent that it is possible to mount the breaker 56 at any height desired without the necessity of drilling and tapping any hole in the bus bar or the side supporting member. This allows a substantial degree of freedom for the insulation of breakers on the panelboard assembly not previously present.

It will also be seen that circuit breakers may be mounted on the bus bars 33, 34 and 35 in exactly the same manner. From the diagram in FIG. 1 it is noted that the terminal assembly 62 which is attached to bus bars 30 and 33 has an extrudable shape and is fabricated from a material which is electrically conductive and which is so shaped as to receive a universal terminal connector which is a subject of the aforementioned Canadian application Ser. No. 092,606 filed Sept. 9, 1970 by Sidney J. Coles et al. The terminal member 62 may be fastened to the bus bars 30 and 33 by means of ordinary carriage bolts or by means of bolts similar to the one illustrated as 41 in FIG. 2. It is only necessary that the terminal member 62 be of sufficient current-carrying capacity to allow proper current distribution between itself and the two bus bars 30 and 33. A similar terminal portion 63 is shown joining bars 32 and 35 and a third terminal member 64 is shown joining bus bars 31 and 34. The method of connection of the members 63 and 64 to the respective bus bars is identical to that used for member 62.

The neutral bus 65 will be fastened to the side supporting members 20 by means of angle-shaped pieces 66 which are screwed to the side supporting members 20 by means of screw fasteners similar to those shown as 22 in FIG. 2. "Clip-in" fasteners similar to those shown as 21 in FIG. 2 will also be used to engage the appropriate slot in side supporting member 20. A bus bar terminal 65 may then be bolted in any convenient manner to the angle-shaped support 67. It is noted that the bus bar terminal member 65 is of such cross section as to receive the universal connector 69 which is the subject of the aforementioned Canadian application.

Figure 6:
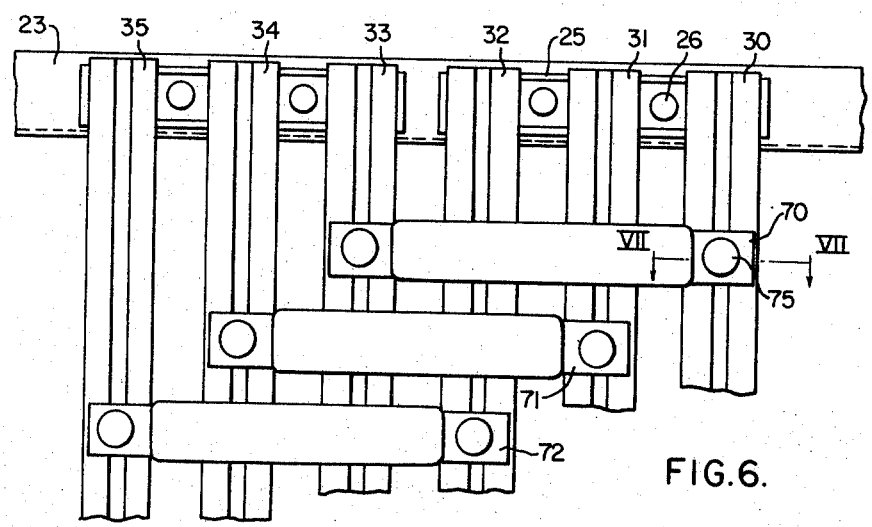
FIG. 6 is an illustration of the bus bar shorting members used to equalize current distribution in the panelboard.

It is noted that the pairs of bus bars are bussed firmly together at their lower terminal ends. It may be necessary to provide additional means to achieve better current distribution in the bus bars of the panelboard assembly. This may be accomplished by interconnecting pairs of bus bars of the same phase at various locations along the length of the paneboard. In extremely long panelboards it may be necessary to have two or three locations where the bus bars of the same phase are interconnected. The interconnecting bars of the panelboard being described are illustrated as 70, 71 and 72 and are shown in FIGS. 1 and 6. It is possible to manufacture the bus bar connecting members from a variety of electrically conductive materials and the method of fastening to the rear face of the bus bar will be accomplished by means of a carriage bolt such as the one illustrated as 73 in FIG. 7, or it may be fastened by means of a specially shaped bolt such as that illustrated as 41 in FIG. 2. Bus bar connecting member 71 is connected by passing a bolt such as the one illustrated as 74 through the clearance hole provided therein at each end of member 70. A nut such as the one illustrated as 76 is threaded on to the end 73 of bolt 74 and the heads of the bolts are inserted into the proper slots of the bus bars 30 and 33 and the bar 70 is slid vertically into position and nuts 76 are tightened to rigidly secure the bus bar connecting member 70 to the bars 30 and 33.

A suitable insulating cap such as that illustrated as 75 (see FIG. 6) may be conveniently threaded on to the protruding threaded portion of bolt 73. This may be necessary in order to obtain adequate electrical clearances between the end of the bolt 74 and the rear face of the panelboard enclosure 10.

Figure 7:
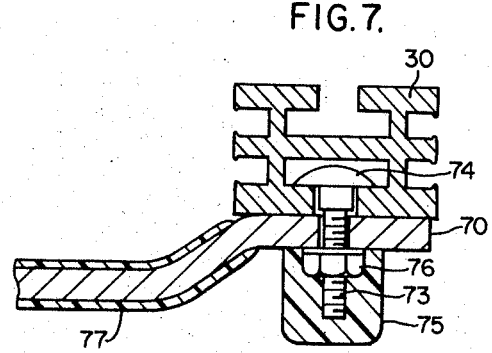
FIG. 7 shows a method of connecting the bus bar shorting members to the bus bars.

It may also be necessary to wrap the bus connecting member 70 with a layer of insulation 77 in order to provide adequate insulation between the rear face of the connecting member 70 and the rear face of the panelboard 10. FIG. 7 illustrates the application of insulation to the bus connector 70. It is noted that insulation 77 may be electrical tape or heat-shrinkable polyvinyl chloride which has been applied to the connector member 70 and heat shrunk in place.

It may also be necessary to provide additional insulation in areas where there is insufficient electrical clearance such as in the lower terminal connecting area where conductors carrying voltages of different phases may be grouped in close physical relationship. In this instance, the additional insulation may be provided for the bus bars and bus terminal connectors by a method illustrated in FIG. 8. Bus terminal member 62 is provided with a slot 78 which has a pair of projections or ears 79 and 80 projecting toward each other in the throat area of the slot 78. An insulating rivet 81 is applied through the hole 82 of the insulating strip 83 and upon suitable pressure rivet 81 may be pushed between the ears 79 and 80 into the slot 78 so as to be firmly engaged by the ears in the slot. In this manner the insulating member 83 is firmly attached to the bus terminal member and because of the shaping of the bus bars, it is possible to attach insulating strips to the sides of the bus bars of this application.

Figure 10:
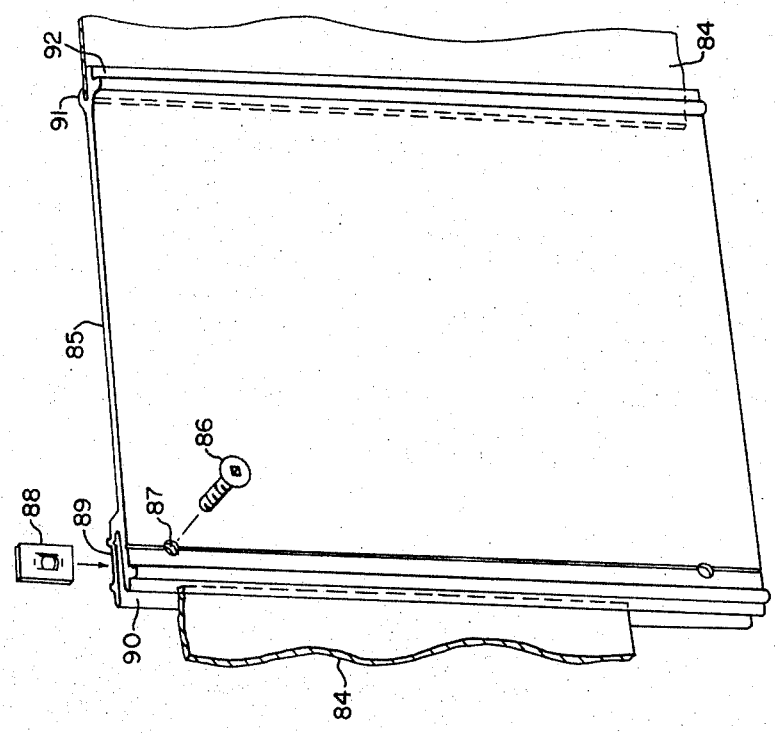
FIG. 10 is an enlarged view of one of the filler plates shown in FIG. 9.
Figure 9:
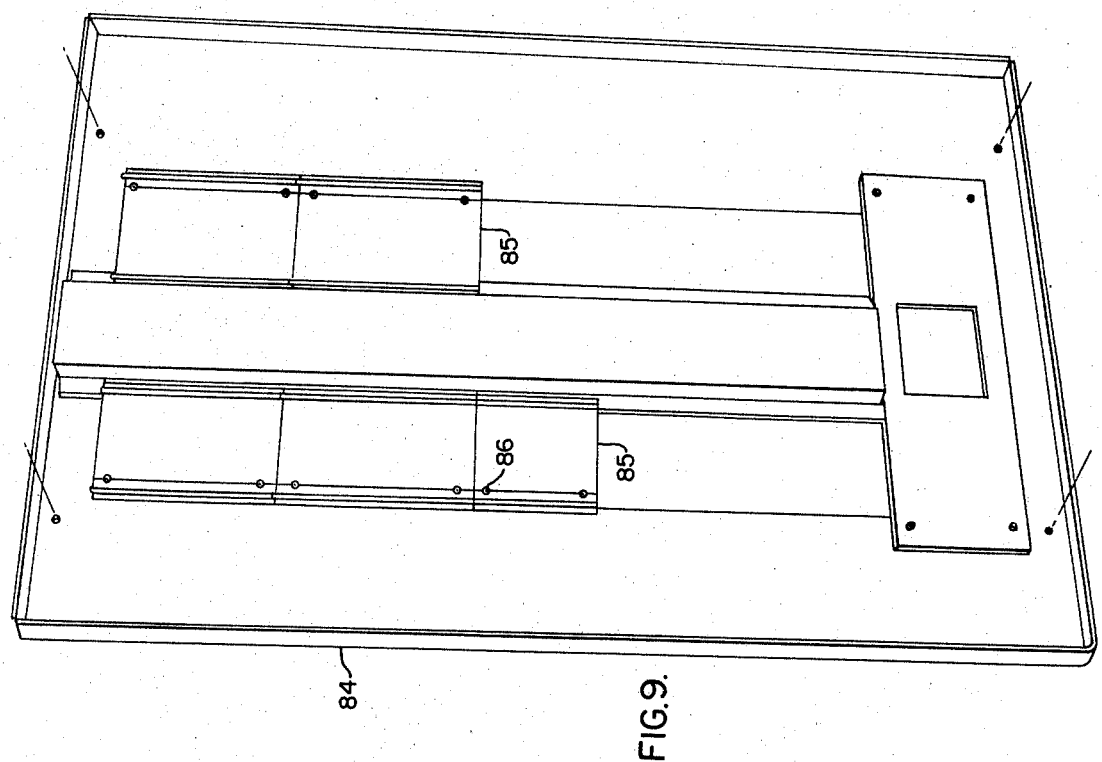
FIG. 9 is an illustration of the trim member for the enclosure of FIG. 1.

This concludes the description of the electrical current carrying portion of the panelboard assembly. Reference is now made to FIGS. 9 and 10 wherein the trim member 84 will be described in detail. Trim member 84 which will be fabricated from steel or other suitable material is attached to the supporting enclosure 10 by means of screws which are passed through the clearance holes provided in the trim member in to the fastening holes shown in the upper and lower turnover flanges of the supporting enclosure 10. Trim member 84 has applied thereto in various locations cover plates such as the one illustrated as 85 and of which an enlarged view is shown in FIG. 10. The cover plate 85 is provided with a bolt 86 which passes through clearance hole 87 into speed fastener 88 which will be held firmly aligned in slot 89 on the rear face of cover plate 85. The cover plate 85 is arranged to have a slot 90 provided in the left hand edge thereof in which a part of the trim member 84 may be suitably received. On the opposite edge of trim member 84 are a pair of projections 91 and 92 which form a slot therebetween which is capable of receiving the adjacent edge of trim member 84. In order to apply the cover plate 85 to the opening in trim member 84, it is necessary to slacken the screws in the left hand side of the cover plate 85 such as the screws illustrated as illustrated and insert the cover plate into the openings in trim member 84 such that trim member 84 is deeply received in slot 90. The cover plate is then pivoted about slot 90 in a counterclockwise direction as viewed from above until projection 91 swings behind the opposing edge of trim member 84. It will be found that projection 92 will engage the opposing edge of trim member 84. At this time it is necessary to slide the cover plate to the right so that projection 91 slides behind trim member 84. Bolts such as the one shown at 86 are tightened on the left hand side of the cover plate and the cover plate will be held securely in place. It will be seen that the cover plate 85 has an extrudable shape, thus it is possible to manufacture cover plates in any convenient length required.

What we claim is:

1. A panelboard assembly comprising an enclosure, a pair of elongated side supporting members supported in said enclosure in a generally parallel spaced relationship, each of said side supporting members having a constant cross section along the entire length thereof with an elongated slot along the entire length thereof open at the front thereof, a plurality of fastening devices captured in said slots, a pair of cross supporting members, screw means connected to said fastening devices to support said cross supporting members on said side supporting members in a generally parallel spaced relationship across said side supporting members, each of said cross supporting members comprising a separate insulating bus bar support means, and a plurality of elongated bus bars supported on said insulating bus bar support means in between said side supporting members in a spaced relationship generally parallel to each other and generally parallel to said side supporting members.

2. A panelboard assembly according to claim 1, each of said side supporting members having another elongated slot along the entire length thereof open at the outer side thereof, a plurality of other fastening devices captured in said other slots, said enclosure comprising a base, a plurality of support members supported on said base, and other screw means cooperating with said support members and connected to said other fastening devices to support said side supporting members on said support members.

3. A panelboard assembly according to claim 2, and height-adjustable supporting means supporting said support members on said base.

4. A panelboard assembly according to claim 1, said plurality of bus bars numbering at least two bus bars per phase, and said plurality of bus bars being supported such that all of said bus bars are coplanar along the front faces thereof.

5. A panelboard assembly according to claim 4, and connecting means connecting bus bars of like phases.

6. A panelboard assembly according to claim 4, each of said side supporting members having another elongated slot along the entire length thereof open at the outer side thereof, a plurality of other fastening devices captured in said other slots, said enclosure comprising a base, a plurality of support members supported on said base, and other screw members cooperating with said supporting members and connected to said other fastening devices to support said side supporting members on said support members.

7. A panelboard assembly according to claim 6, and height-adjustable support means supporting said support members on said base.

8. A panelboard assembly according to claim 7, and connecting means connecting bus bars of like phases.

* * * * *